United States Patent [19]
Yokoya et al.

[11] Patent Number: 6,043,448
[45] Date of Patent: Mar. 28, 2000

[54] METHOD OF WELDING CYLINDRICAL BODIES

[76] Inventors: Kazuhiko Yokoya, 808-257, Higashigaoka-machi, Kishiwada, Osaka Prefecture; Johichi Gotoh, 6-6-4, Ohnodai, Osaka-Sayama, Osaka Prefecture, both of Japan

[21] Appl. No.: 09/081,407

[22] Filed: May 19, 1998

[51] Int. Cl.[7] .................................................. B23K 11/24
[52] U.S. Cl. ........................................... 219/108; 219/64
[58] Field of Search ................................... 219/108, 110, 219/117.1, 64

[56] References Cited

U.S. PATENT DOCUMENTS

| | | | |
|---|---|---|---|
| 4,414,455 | 11/1983 | Schneider et al. | 219/108 |
| 4,554,430 | 11/1985 | Belamaric | 219/108 |
| 4,595,326 | 6/1986 | Matsuno et al. | 219/108 |
| 4,654,503 | 3/1987 | Tajiri | 219/110 |
| 4,721,841 | 1/1988 | Pazzaglia et al. | 219/110 |
| 4,868,364 | 9/1989 | Kawano et al. | 219/110 |
| 5,237,147 | 8/1993 | Pazzaglia | 219/108 |
| 5,489,757 | 2/1996 | Schuermann et al. | 219/110 |

*Primary Examiner*—Clifford C. Shaw
*Attorney, Agent, or Firm*—Vedder, Price, Kaufman & Kammholz

[57] ABSTRACT

A method for welding using an on/off switching control. The switching control forms a wave cycle with a plurality of peaks. Within a half wave cycle (½f) of welding current f, the wave form takes the shape of an inclined straight line A rising to a predetermined current value S1, a pause in the current which causes a straight line B to extend from upper end of line A, a voltage drop as shown by straight line C, which is shown as a straight line from B to a predetermined current drop, a drop pause as shown by straight line D and at least another current rise and current pause extending from straight line D, wherein all the welding periods are of the same time duration so that welding nuggets are evenly formed.

4 Claims, 5 Drawing Sheets

DC = 450 V
DR RATE = 63 %
$T_{11} = T_{12}$

A: RISING STRAIGHT LINE
B: PAUSE STRAIGHT LINE
C: DROP STRAIGHT LINE
D: DROP PAUSE STRAIGHT LINE

DC = 450 V
DR RATE = 63%
$T_{11} = T_{12}$

A: RISING STRAIGHT LINE
B: PAUSE STRAIGHT LINE
C: DROP STRAIGHT LINE
D: DROP PAUSE STRAIGHT LINE

DC = 450 V
DR RATE = 50%
$T_{12} = T_{11} - T_{11} \times 8\% \mu s$

DC = 450 V
DR RATE = 75%
$T_{12} = T_{11} + T_{11} \times 8\% \mu s$

DC = 350 V
DR RATE = 75%
$T_{11} = T_{12}$

DC = 350 V
DR RATE = 63%
$T_{12} = T_{11} - T_{11} \times 7\% \mu s$

DC = 350 V
DR RATE = 88%
$T_{12} = T_{11} + T_{11} \times 7\% \mu s$

DC = 450 V
DR RATE = 63%
$T_{13} = T_{14} = T_{15}$

DC = 450 V
DR RATE = 50%
$T_{14} \cdot T_{15} = T_{13} - T_{13} \times 8\% \mu s$ DC = 450 V
DR RATE = 75%
$T_{14} \cdot T_{15} = T_{13} + T_{13} \times 8\% \mu s$

METHOD OF WELDING CYLINDRICAL BODIES

BACKGROUND OF THE INVENTION

1. Field of the Invention

The present invention relates to a method of welding cylindrical bodies used when manufacturing a can containing, for example, beverage.

2. Description of the Related Art

Generally, as manufacturing means of such can, both edges of a metal plate are overlaid and welded into a cylindrical form, and lid plates are attached to both sides of the opening of the cylindrical body.

Such welding method was conventionally disclosed, for example, in Laid-open Japanese Patent Publication No. 58-25886 and Laid-open Japanese Patent Publication No. 4-49794(U.S. Pat. No. 2,524,047). In these publications, the welding current waveform is controlled by chopping in multiple pulse forms by a chopping mechanism in every half cycle of welding frequency, and welding is done by the current waveform under chopping control. In these welding methods, as compared with the known method of welding by forming current waveforms by on/off switching control, generation of splashes in the nugget between overlaid portions of a metal plate is suppressed, and a cylindrical body excellent in strength is obtained.

In such welding methods, however, since chopping current waveforms of multiple pulse forms are formed in every half cycle of welding frequency, the chopping mechanism is required to send and receive multiple signals. It is also required to check every one of these signals. Hence, in relation to the response time, the welding speed is slow. In particular, since it is necessary to control the rising straight line of current waveform by chopping with plural signals, the rising speed of current waveform is slow. As a result, the welding speed is low.

Recently, in order to lower the manufacturing cost of cans, it is demanded to increase the manufacturing speed of cylindrical bodies, that is, the welding speed. For example, hitherto, the speed as about 500 pieces/minute, but it is recently requested from the users to enhance the speed to about 1000 to 1200 pieces/minute. Such request is not satisfied if welding is done by such chopping current waveform.

The present inventor previously proposed a welding method for cylindrical bodies at high speed (Japanese Patent Application No. 7-341741). Its basic constitution is shown in FIG. 11, in which, in every half cycle ½f of welding frequency f, the welding current waveform comprising a rising straight line A rising up to a specified rising current set value S1, a pause straight line B extending from its upper end, a drop straight line C dropping from its rear end to a specified current drop set value S2, a drop pause straight line D extending from its lower end, and at least a rising straight line A1 and a pause straight line B1 consecutive to this drop pause straight line D is formed by the conventional on/off switching control without resort to chopping control. Consequently, the current set value S1 of the welding current waveform is set constant and the current drop set value S2 is set constant. Further, by individually varying the duration of time T21, T22 of each pause straight line B, B1, the drop pause straight line D is set at specified time T23.

By welding the overlaid portions of a cylindrical body while repeating such welding current waveform, small nuggets are formed between the overlaid portions, without generating splashes, favorable in a uniform size and at a uniform small pitch interval. Moreover, without forming blow holes or cracks, the cylindrical body is excellent in strength. In the case of cylindrical bodies used in general beverage cans (cylindrical length being 70 to 140 mm), it is possible to weld at high speed of about 1000 to 1200 pieces/minute.

In this welding method, however, although the cylindrical body can be welded at high speed, the following inconvenience was discovered in actual work. That is, when welding cylinders, it is necessary to vary the welding current waveform depending on their kind and material. In this welding method, to vary the welding current waveform, it is necessary to set again the time T21, T22 of each pause straight line B, B1, time T23 of drop pause straight line D, rising current set value S1, and current drop set value S2 multiple times on every occasion. Therefore, the working efficiency is poor.

It is hence an object of the invention to present a welding method capable of forming small nuggets of uniform size between overlaid portions of a cylindrical body favorably at small pitch intervals to obtain cylindrical bodies of excellent strength, lowering the cost by welding the cylinders at high speed, and enhancing the working efficiency by decreasing the number of times of setting when changing the welding current waveform depending on the kind and material of cylinders.

SUMMARY OF THE INVENTION

To achieve the object, a welding method according to an embodiment of the invention is to form welding current waveforms with plural peaks having, within a half cycle ½f of welding current f, a rising straight line A rising up to a specified rising current set value S1, a pause straight line B extending from its upper end, a drop straight line C dropping from its rear end to a specified current drop set value S2, a drop pause straight line D extending from its lower end, and at least rising straight line A and pause straight line B consecutive to this drop pause straight line D by on/off switching control. Then the duration of each pause straight line B of the welding current waveforms is set at the same value, and the duration of the drop pause straight line D is set at a multiple of 1 or more of the set duration of the pause straight line B. Therefore each duration of the pause straight line B and drop pause straight line D can be set by tuning. Moreover, the rising current set value S1 can be set, and the drop rate from the rising current set value S1 to the current drop set value S2 can be set.

According to the welding method, by setting the duration of each pause straight line B of the welding current waveforms at the same value, and setting the duration of the drop pause straight line D at a multiple of 1 or more of the set duration of the pause straight line B, each duration of the pause straight line B and drop pause straight line D can be set by tuning. Therefore, if, for example, the duration of the pause straight line B is set, the subsequent duration of the pause straight line B and duration of the drop pause straight line D are set automatically. Hence, when changing the welding current waveforms depending on the kind or material of the cylindrical body, it is enough to set the duration of the pause straight line B, rising current set value S1 and drop rate. As a result, the number of times of setting is decreased and the working efficiency is enhanced.

Moreover, by forming the welding current waveforms by on/off switching control, the control speed of the straight lines A to D can be accelerated. In particular, the rising straight line A of the welding current waveforms is raised by a steep gradient up to the specified current set value S1. Therefore, the welding speed of the cylindrical body is enhanced. As a result, mass production of cylindrical bodies at high speed is realized, and the manufacturing cost can be lowered. Moreover, by welding the overlaid portions of the cylindrical body by repeating such welding current waveforms, as proposed previously, without generating splash, small nuggets are formed between the overlaid portions favorably in a uniform size and at a uniform small pitch interval. Besides, blow holes and cracks are not formed, and the cylindrical bodies excellent in strength are obtained.

Further, by forming nuggets of uniform size between overlaid portions of the cylindrical body at a small pitch interval, the number of nuggets between the overlaid portions can be increased, and the welding strength can be strengthened. Therefore, a thin wall material can be used as the material for the cylindrical body, and the manufacturing cost can be lowered. It is also possible to prevent damage of the welding transformer and others used as the welding equipment due to high temperature. That is, by setting the drop rate to set the drop current set value S2 at a constant value, and raising the rising straight line after the drop pause straight line D from this set value S2 till the rising current set value S1, in other words, by raising the rising straight line after the drop pause straight line D up to the current set value S1 in the state of holding the specified fuse energy at the drop current set value S2, fluctuations of the welding current are smaller and load fluctuations of the welding transformer are decreased. Therefore, breakage of the welding transformer and others due to high temperature is prevented.

In a preferred embodiment of the invention, it is designed to form welding current waveforms with two peaks having, within a half cycle ½f, a first rising straight line A rising up to a specified rising current set value S1, a first pause straight line B extending from its upper end, a first drop straight line C dropping from its rear end to a specified current drop set value S2, a first drop pause straight line D extending from its lower end, a second rising straight line A1 rising from its rear end to the current set value S1, and a second pause straight line B1 extending from its upper end, by on/off switching control. Then by setting the duration of T1, T2 of the first and second pause straight lines B, B1 of the welding current waveforms at the same value, and setting the duration of T3 of the first drop pause straight line D at a multiple of 1 or more of the set duration of T1, T2 of the pause straight lines B, B1, each duration of T1, T2, T3 of these pause straight lines B, B1 and drop pause straight line D can be set by tuning. Also the rising current set value S1 can be set, and the drop rate from the rising current set value S1 to the current drop set value S2 can be set.

Thus, while enhancing the working efficiency, without generating splashes, small nuggets (for example, about 0.4 to 1.1 mm in length) are formed between the overlaid portions of the cylindrical body in a uniform size and at a uniform small pitch interval (for example, about 0.4 to 1.1 mm), favorably at high speed. Two nuggets are formed in every peak of the welding current waveform, one in the first half and the other in the second half. In this embodiment, therefore, two nuggets are formed, in the first half from the zero cross point A0 shown in FIG. 2 to the middle of the first rising straight line A, first pause straight line B, first drop straight line C, and first drop setting straight line D, and in the second half from the middle of the first drop setting straight line D to the zero cross point A0 in the second rising straight line A1, second pause straight line B1, and next rising straight line A (in the half cycle from zero cross point A0 to A0). Moreover, by forming the welding current waveform with two peaks by on/off switching control, the welding speed between overlaid portions of the cylindrical body is increased while forming favorable small nuggets uniformly at a small pitch interval, and in the case of cylindrical bodies(70 to 140 mm in length) used in ordinary beverage cans, the speed is increased to about 1000 pieces/ minute. Hence, mass production of cylinders at high speed is realized, and the cost can be lowered.

In another preferred embodiment, the drop rate is set and adjusted so that the duration of T11 from start of the first rising straight line A till end of the first pause straight line B in the welding current waveforms with two peaks formed by on/off switching within half cycle ½f, and the duration of T12 from start of the first drop straight line C till end of the second pause straight line B1 at the end side of the first pause straight line B may be in the relation of T12=T11±T11×(0 to 15%) ms.

Thus, since the working efficiency is enhanced by decreasing the number of times of setting, although the time T1 of the first pause straight line B and the time T2 of the second pause straight line B1 in the welding current waveforms are set at the same value, the size of each nugget formed between the overlaid portions of the cylindrical body can be adjusted to be uniform. That is, when T1 and T2 are set at the same value, the fuse energy forming the nugget in the first half of the welding current waveform is lower than the fuse energy forming the nugget in the second half. More specifically, comparing the fuse energy of the nugget formed in the first half of the welding current waveform and the fuse energy of the nugget formed in the second half, since the first drop pause straight line D is set at the specified current set value S2 and the specified fuse energy is preliminarily maintained by this drop current set value S2, the fuse energy in the second half is higher than the fuse energy of the first half. Accordingly, the fuse energies of the first half and second half are different from each other, and the nuggets may be non-uniform. However, for the time T1, T2 of the first and second pause straight lines B, B1, by setting the time T3 of the first drop setting straight line D at a longer time by a specified multiple, the fuse energy in the second half of the welding current waveform is decreased, so that the fuse energies of the first half and second half are nearly equalized. In addition, with T1 and T2 set at the same value, when the duration of T11 from start of the first rising straight line A till end of the first pause straight line B, and the duration of T12 from start of the first drop straight line C till end of the second pause straight line B1 at the end side of the first pause straight line B are adjusted in the relation of T12=T11±T11×(0 to 15%) ms by adjusting the drop rate, the fuse energy may be equalized between the first half and second half of the welding current waveform. Hence, the size of the nuggets formed in the first half and second half is equalized. Incidentally, if the drop rate is adjusted so that the time difference between T12 and T11 may be more than ±15% ms, the fuse energy difference between the first half and second half of the welding current waveform is too large, and the size of the nuggets formed in the first half and second half changes significantly. It is therefor preferred to define the drop rate within the range of the formula above.

In a different embodiment of the invention, it is to form welding current waveforms with three peaks having, within a half cycle ½f, a first rising straight line A rising up to a specified rising current set value S1, a first pause straight line B extending from its upper end, a first drop straight line C dropping from its rear end to a specified current drop set value S2, a first drop pause straight line D extending from its lower end, a second rising straight line A1 rising from its rear end to the current set value S1, a second pause straight line B1 extending from its upper end, a third rising straight line A2 rising form this drop pause straight line D1 to the current set value S1, and a third pause straight line B2 extending from its upper end, by on/off switching control. Then, by setting the duration of T4, T5, T6 of the first to third pause straight lines B to B2 of the welding current waveforms at the same value, and setting the duration of T7, T8 of the first and second drop pause straight lines D, D1 at a multiple of 1 or more of the set duration of T4, T5, T6 of these pause straight lines B to B2, each duration of T4, T5, T6 of these pause straight lines B to B2 and each duration of T7, T8 of the drop pause straight lines D, D1 can be set by tuning, the rising current set value S1 can be set, and the drop rate from the rising current set value S1 to the current drop set value S2 can be set.

Thus, while enhancing the working efficiency, without generating splashes, smaller nuggets (for example, about 0.4 to 0.9 mm in length) are formed between the overlaid portions of the cylindrical body in a uniform size and at a uniform small pitch interval (for example, about 0.4 to 0.9 mm), and the number of nuggets between the overlaid portions can be further increased. Three nuggets are formed in every peak of the welding current waveform, in the first half, in the middle, and in the second half. That is, in this embodiment, three nuggets are formed, in the first half from the zero cross point A0 shown in FIG. 8 to the middle of the next first rising straight line A, first pause straight line B, first drop straight line C, and first drop setting straight line D, in the middle from the middle of the first drop setting straight line D to the middle of the second rising straight line A1, second pause straight line B1, second drop straight line C1 and second drop setting straight line D1, and in the second half from the middle of the second drop setting straight line D1 to the zero cross point A0 at the third rising straight line A2, third pause straight line B2 and next rising straight line A (in the half cycle from zero cross point A0 to A0). As a result, the number of nuggets formed between the overlaid portions of the cylindrical body is further increased, and the welding strength is reinforced more, so that a material of a smaller wall thickness can be used as the material for cylindrical bodies, and the manufacturing cost can be lowered. Moreover, by forming the welding current waveform with three peaks by on/off switching control, the welding speed between overlaid portions of the cylindrical body is increased while forming favorable small nuggets uniformly at a small pitch interval, and in the case of cylindrical bodies used in ordinary beverage cans, the speed is increased to about 1000 to 1200 pieces/minute. Hence, mass production of cylindrical bodies at high speed is realized, and the cost can be further lowered.

Further, when using current waveforms with three peaks, if the welding speed is set at about 500 to 1000 pieces/minute by selecting the duration of T4, T5, T6 of the pause straight lines B to B2, the duration of T7, T8 of the drop pause straight lines D, D1, the rising current set value S1, the drop rate from it to the current drop set value S2, and the DC voltage, nuggets of about 0.1 to 0.4 mm in length are favorably formed at a pitch interval of about 0.09 to 0.39 mm. At this time, by setting the pitch interval smaller than the nugget length, and overlapping mutually adjacent nuggets, if a thin plate (for example, 0.1 to 0.25 mm) is used as the material for a cylindrical body, a strong welding strength is obtained. Or, when overlapped, occurrences of sparks in welding are notably decreased and current fluctuations are decreased. As a result, welding defects, that is, the defective rate of products may be decreased, and damage of the welding transformer and others can be prevented.

In another different preferred embodiment, the drop rate is set and adjusted so that the duration T13 start of the first rising straight line A till end of the first pause straight line B in the welding current waveforms with three peaks formed by on/off switching within half cycle ½f, the duration T14 from start of the first drop straight line C till end of the second pause straight line B1 at the end side of the first pause straight line B, and the duration T15 from start of the second drop straight line C1 till end of the third pause straight line B at the end side of the second pause straight line B1 may be in the relation of T14, T15=T13±T13×(0 to 15%) ms.

Thus, since the working efficiency is enhanced by decreasing the number of times of setting, although the duration of T4, T5, T6 of the first to third pause straight lines B to B2 of the welding current waveform is set at the same value, as mentioned above, the size of nuggets formed between the overlaid portions of the cylindrical body is adjusted to be uniform.

In a further preferred embodiment, the drop rate from the rising current set value S1 to the current drop set value S1 is 30 to 90%. By defining the drop rate in this range, while forming uniform nuggets at a small pitch interval at high speed, fluctuations of welding current are decreased, and the load fluctuations of the welding transformer are reduced, thereby preventing the welding transformer and others from being broken down due to high temperature. If the drop rate is less than 30%, it is hard to equalize the fuse energy between the first and second half of the welding current waveform, and uniform nuggets can be hardly formed at equal pitch interval. If more than 90%, the drop of the welding current is large, and the welding current fluctuation is significant, and the load fluctuation of the welding transformer increases, and the welding transformer and others may be broken due to high temperature. Hence, it is preferred to define the drop rate within this range.

In a still further embodiment, the DC voltage for forming welding current waveforms is variably controllable. Therefore, for example, when the DC voltage is high, the rising straight line of the welding current waveform has a steeper gradient as compared with the case of low voltage. Hence, by variably controlling the DC voltage, the adjusting range when forming the welding current waveform is extended, and a large degree of freedom is obtained. Therefore, the invention is advantageous when applied in a welding machine whose resistance is changed due to deterioration of insulation after long use, or in a used welding machine.

DETAILED DESCRIPTION OF THE PREFERRED EMBODIMENTS

Figure 1:
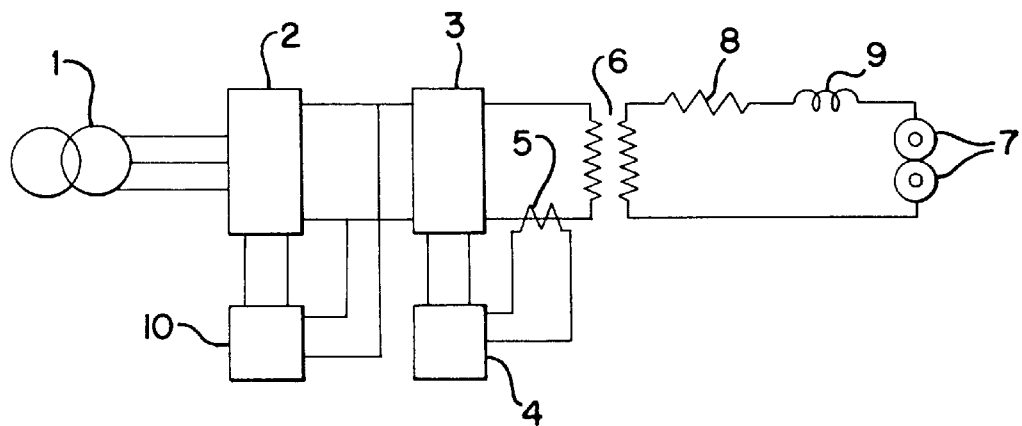
FIG. 1 is a block diagram showing a welding apparatus according to the invention.

FIG. 1 shows a welding apparatus preferably used in the invention. This apparatus is a conventional one, which comprises, as described briefly, a three-phase alternating-current power source 1, a converter 2, an inverter 3, a control unit 4 for controlling the inverter 3, a Hall CT 5 for monitoring the output current, and a welding transformer 6. At the secondary side of the welding transformer 6, a pair of upper and lower welding roll electrodes 7,7 are provided. At the secondary side of the transformer 6, a resistance 8 and an inductance 9 are loaded. The converter 2 is provided with a control unit 10 for variable controlling its output, that is, the DC voltage.

In the invention, when manufacturing, for example, beverage cans by using this welding apparatus, in the case of seam welding of overlaid portions of both edges of a cylindrical body made of a metal plate, the cylindrical body is welded by forming the following welding current waveform by the control unit 4.

That is, in the embodiments in FIG. 2 to FIG. 7, within a half cycle ½f of welding frequency f, a welding current waveform with two peaks is formed by the conventional on/off switching control without resort to chopping control. This welding current waveform is formed of a first rising straight line A rising up to a specified rising current set value S1, a first pause straight line B extending from its upper end, a first drop straight line C dropping from its rear end to a specified current drop set value S2, a first drop pause straight line D extending from its lower end, a second rising straight line A1 rising from its rear end to the current set value S1, and a second pause straight line B1 extending from its upper end. Two of such welding current waveform are formed in half cycle ½f, and a total of four in one cycle f.

Then the time T1 of the pause straight line B of the welding current waveforms and the time T2 of the pause straight line B1 are set at T1=T2, and the time T3 of the drop pause straight line D is set at n times of 1 or more (number including decimal point of n=1 or more) of the set duration of T12, T2. Therefore, each duration of T1, T2, T3 of the pause straight line B and drop pause straight line D can be set by tuning. Moreover, the rising current set value S1 can be set, and the drop rate (Dr rate) from the rising current set value S1 to the current drop set value S2 can be set.

At this time, the drop rate is set and adjusted so that the duration of T11 from start of the first rising straight line A till end of the first pause straight line B in the welding current waveform, and the duration of T12 from start of the first drop straight line C till end of the second pause straight line B1 at the end side of the first pause straight line B may be in the relation of T12=T11±T11×(0 to 15%) ms. That is, in the state of setting the duration of T3 of the drop pause straight line D at a constant value on the basis of the duration of T1, T2 of the pause straight lines B, B1, by adjusting the drop rate by setting, the duration of T12 to T11 varies due to vertical move of the current drop set value S2, and the range of such variation is adjusted within ±0 to 15% ms. By adjusting the drop rate in this range, the fuse energy is nearly equal between the first half and the second half in the welding current waveform for forming nuggets. As a result, the size of nuggets formed in the first half and second half is nearly uniform.

Figure 2:
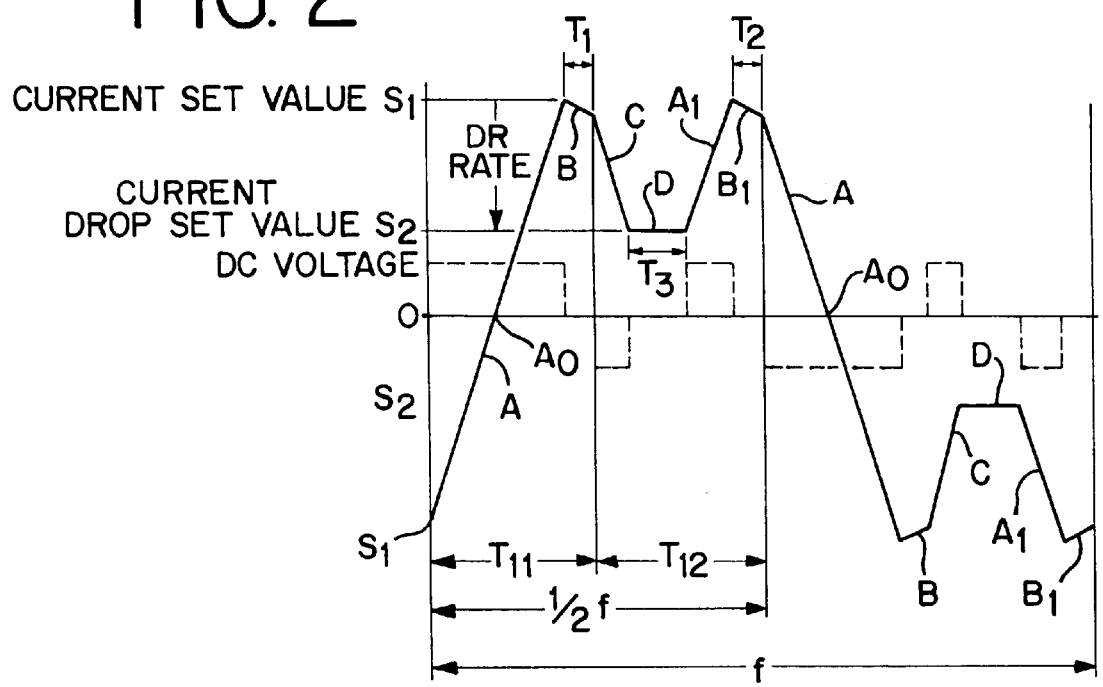
FIG. 2 is a diagram showing a welding current waveform with two peaks used in the welding method of the invention.

More specifically, in FIG. 2, by presetting at a ratio of T1, T2: T3=1:2, the duration is determined as T1, T2=100 ms, and T3=200 ms. Setting the DC voltage=450 V, S1=4500 A, drop rate (Dr rate)=63%, the condition is determined as S2=1665 A, T11=540 ms, and T12=540 ms. The frequency f is 463 Hz.

Figure 3:
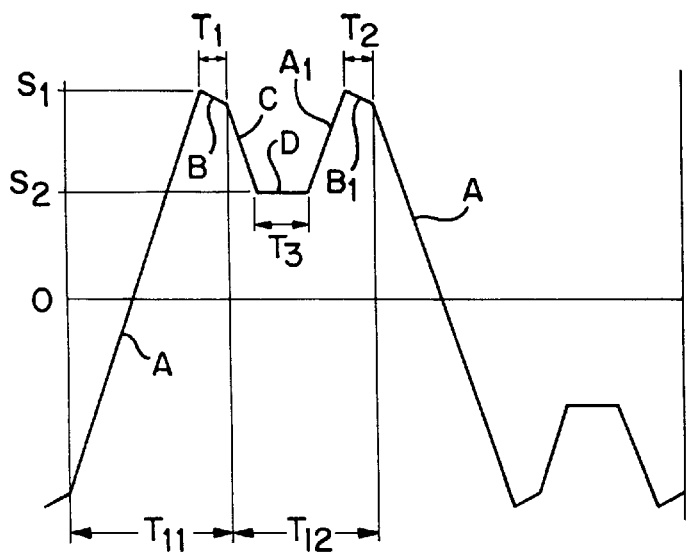
FIG. 3 is a diagram showing another embodiment of welding current waveform with two peaks.

In FIG. 3, the DC voltage, T1 to T3, S1, and T11 are in the same condition as in FIG. 2, and the drop rate is adjusted to 50%. At this time, S2=2250 A, T12=T11−T11×8% ms, and T12×495 ms. The frequency f is 484 Hz.

Figure 4:
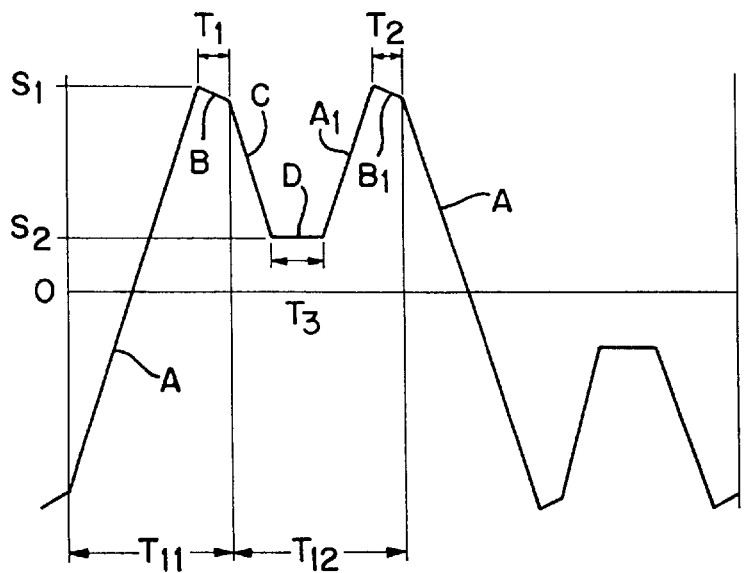
FIG. 4 is a diagram showing a different embodiment of welding current waveform with two peaks.

In FIG. 4, the DC voltage, T1 to T3, S1, and T11 are in the same condition as in FIG. 2, and the drop rate is adjusted to 75%. At this time, S2=1125 A, T12=T11−T11×8% ms, and T12=585 ms. The frequency f is 444 Hz.

Figure 5:
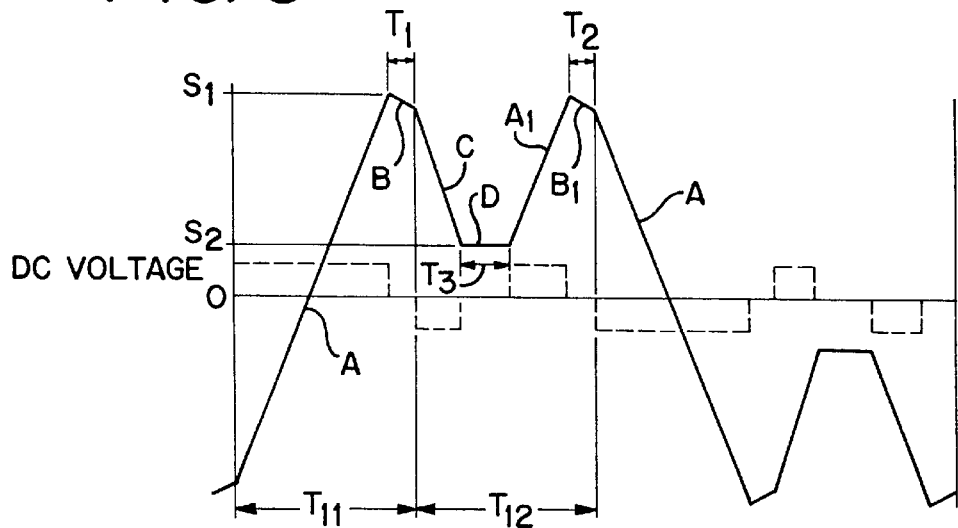
FIG. 5 is a diagram showing a different embodiment of welding current waveform with two peaks.
Figure 6:
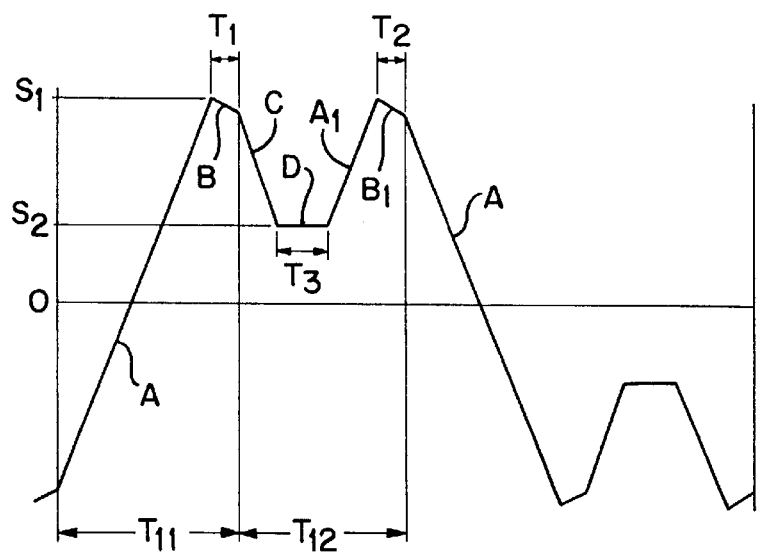
FIG. 6 is a diagram showing a different embodiment of welding current waveform with two peaks.
Figure 7:
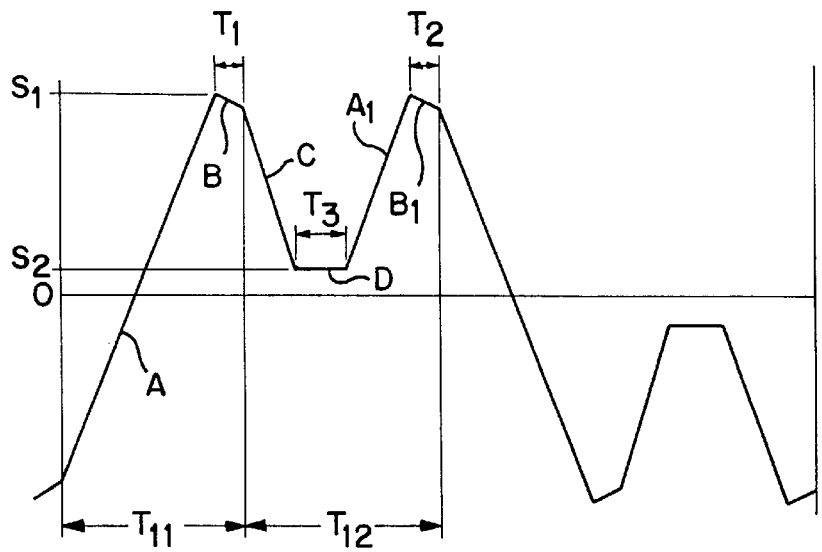
FIG. 7 is a diagram showing a different embodiment of welding current waveform with two peaks.

FIG. 5 to FIG. 7 show embodiments differing in DC voltage and other conditions as compared with FIG. 2 to FIG. 4. In FIG. 5, T1, T2=100 ms, T3=200 ms, and DC voltage=350 V, S1=4500 A, drop rate=75%, and S2=1200 A, T11=630 ms, and T12=630 ms. The frequency f is 397 Hz.

In FIG. 6, the DC voltage, T1 to T3, S1, and T11 are in the same condition as in FIG. 5, and the drop rate is adjusted to 63%. At this time, S2=1776 A, T12=T11−T11×7% ms, and T12=585 ms. The frequency f is 412 Hz.

In FIG. 7, the DC voltage, T1 to T3, S1, and T11 are in the same condition as in FIG. 5, and the drop rate is adjusted to 88%. At this time, S2=576 A, T12=T11−T11×7% ms, and T12=675 ms. The frequency f is 383 Hz.

In the above welding current waveforms, two nuggets are formed in the first half and second half corresponding to the two peaks. That is, referring to FIG. 2, one nugget is formed in the first half from the zero cross point A0 to the middle of the subsequent first rising straight line A, first pause straight line B, first drop straight line C, and first drop setting straight line D. One more nugget is formed in the second half from the middle of the first drop setting straight line D to the zero cross point A0 on the second rising straight line A1, second pause straight line B1, and next rising straight line A. That is, two nuggets are formed in a half cycle of zero cross point A0 to A0. At this time, in the diagram, the reference point of the welding current waveform is set at the start of the first rising straight line A different from the nugget forming reference point, and T11 and T12 are set on the basis of start point, for the reason as explained below. That is, on the basis of the zero cross point A0 of the rising straight line A, supposing the time up to the middle of the first drop setting straight line D to be T11, and the time from the middle of this first drop setting straight line D to the zero cross point A0 on the next rising straight line A to be T12, when the first drop setting straight line D is moved vertically by adjusting, for example, the drop rate, this first drop setting straight line D moves vertically along the first drop straight line C while keeping a preset value. Accordingly, the time T11 as the reference of T12 fluctuates, and both T11 and T12 vary significantly, and it is hard to control the welding current waveform, and the object of the invention is not achieved.

Thus, by setting the duration of T11, T12 of the pause straight lines B, B1 of the welding current waveform preliminarily at the same value, setting the duration of T3 of the drop pause straight line D preliminarily at a specific multiple of the set time T1, T2, setting T1 to T3 of the pause straight line B and drop pause straight line D by tuning, and setting the rising current set value S1 and drop rate, the welding current waveforms shown in FIG. 2 to FIG. 7 are obtained. Hence, when changing the welding current waveform depending on the kind or material of the cylindrical bodies, the number of times of setting is curtailed as compared with the prior art, and the working efficiency is enhanced.

By welding between the overlaid portions of the cylindrical body in the above conditions, nuggets in a length of 0.4 to 1.1 mm are formed in a uniform size, without generating splashes, favorably at a small pitch interval of about 0.4 to 1.1 mm. After welding, the cylindrical body is free from blow holes or cracks, and is excellent in strength.

Further, by forming such welding current waveforms by on/off switching control, the control speed of the straight lines A to B1 is increased. In particular, the rising straight lines A, A1 of current waveform can be raised to the specified current set value S1 by a steep gradient. Hence, the welding speed between overlaid portions of a cylindrical body is enhanced. For example, in the case of cylindrical bodies (70 to 140 mm long) used in ordinary beverage cans, the welding speed is increased to about 1000 pieces/minute.

Besides, by forming uniform nuggets at a small pitch interval between the overlaid portions of a cylindrical body, the number of nuggets between the overlaid portions is increased, and the welding strength is reinforced. Hence, thin wall materials can be used for cylindrical bodies, and the manufacturing cost can be lowered.

Moreover, by setting the rising current set value S1 at a specified value, adjusting the drop rate from the rising current set value S1 to the current drop set value S2 by setting, keeping a specified fuse energy by this drop current set value S2, and raising the rising straight line A1 after the drop pause straight line D up to the current set value S1, fluctuations of welding current are small, and load fluctuations of the welding transformer are decreased. Therefore, breakage of the welding transformer and others due to high temperature can be prevented.

As compared with FIG. 2 to FIG. 4, as shown in FIG. 5 to FIG. 7, by variable control of the DC voltage for forming welding current waveform, when the DC voltage is high, the rising angle of the first and second rising straight lines A, A1 has a steeper gradient as compared with the case of low voltage (in FIG. 2 to FIG. 4, the angle of A, A1 has a steeper gradient as compared with the case in FIG. 4 to FIG. 7), and hence the adjusting range when forming the welding current waveform is expanded, and a larger degree of freedom is obtained. The invention is also advantageous when applied in a welding machine whose resistance is changed due to deterioration of insulation in a long course of use, or in a used welding machine.

Figure 8:
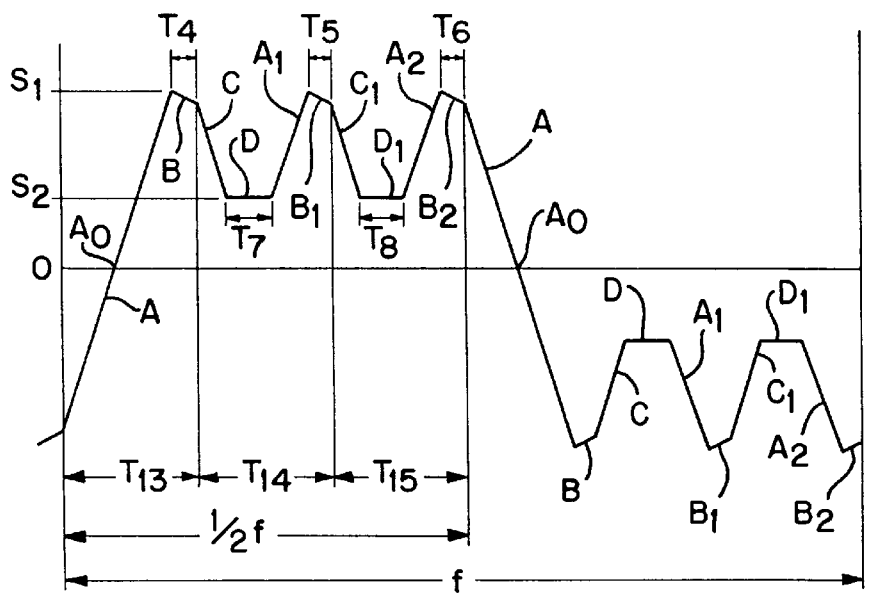
FIG. 8 is a diagram showing a welding current waveform with three peaks used in the welding method of the invention.
Figure 9:
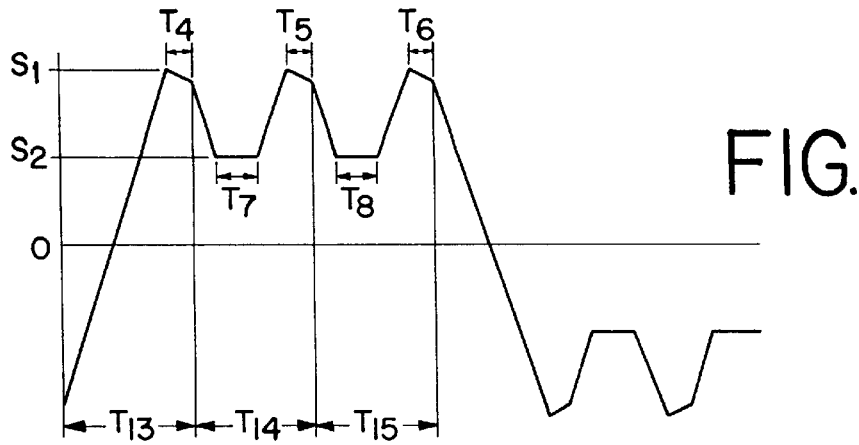
FIG. 9 is a diagram showing another embodiment of welding current waveform with three peaks.
Figure 10:
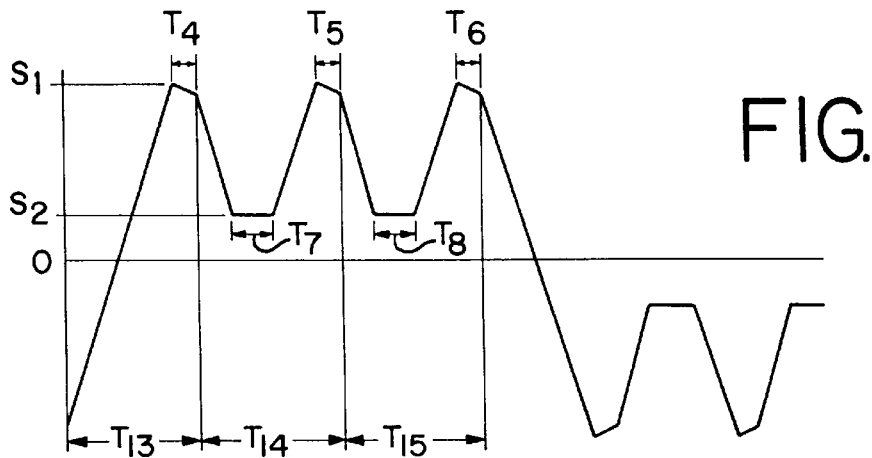
FIG. 10 is a diagram showing a different embodiment of welding current waveform with three peaks.
Figure 11:
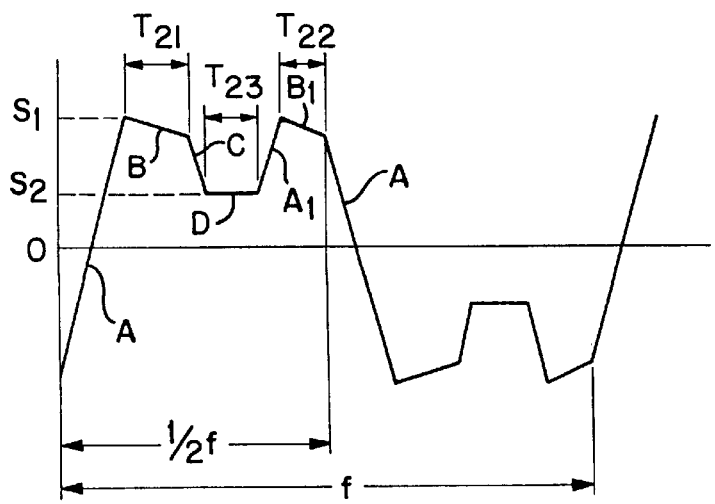
FIG. 11 is a diagram showing a conventional welding current waveform.

In the embodiments in FIGS. 8 to 10, without resort to chopping control, welding current waveforms with three peaks are formed by conventional on/off switching control. The welding current waveform is formed of a first rising straight line A rising up to a specified rising current set value S1, a first pause straight line B extending from its upper end, a first drop straight line C dropping from its rear end to a specified current drop set value S2, a first drop pause straight line D extending from its lower end, a second rising straight line A1 rising from its rear end to the current set value S1, a second pause straight line B1 extending from its upper end, a third rising straight line A2 rising form this drop pause straight line D1 to the current set value S1, and a third pause straight line B2 extending from its upper end. Three of such welding current waveform are formed in a half cycle ½f.

Then, the duration of T4, T5, T6 of the pause straight lines B, B1, B2 of the welding current waveforms is set at T4=T5=T6, and the duration of T7, T8 of the drop pause straight lines D, D1 is set at n times of 1 or more (n being a number including decimal point of n=1 or more) of the set duration of T4, T5, T6. Each duration of T4 to T8 of these pause straight lines B to B2 and drop pause straight lines D, D1 can be set by tuning. Further, the rising current set value S1 can be set, and the drop rate (Dr rate) from the rising current set value S1 to the current drop set value S2 can be set.

At this time, the drop rate is set and adjusted so that the duration T13 from start of the first rising straight line A till end of the first pause straight line B in the welding current waveform, the duration T14 from start of the first drop straight line C till end of the second pause straight line B1 at the end side of the first pause straight line B, and the duration T15 from start of the second drop straight line C1 till end of the third pause straight line B at the end side of the second pause straight line B1 may be in the relation of T14, T15=T13±T13×(0 to 15%) ms. By adjusting the drop rate in this range, the fuse energy is nearly equal in the first half, the middle and the second half in the welding current waveform for forming nuggets. As a result, the size of nuggets formed in the first half, middle and second half is nearly uniform.

More specifically, in FIG. 8, by presetting at a ratio of T4, T5, T6: T7, T8=1:2, the duration is determined as T4, T5, T6=35 ms, and T7, T8=70 ms. Setting the DC voltage=450 V, S1=4800 A, drop rate 63%, the condition is determined as S2=1776 A, T13=T14=T15=350 ms. The frequency f is 476 Hz.

In FIG. 9, the DC voltage, T4 to T8, S1, and T13 are in the same condition as in FIG. 8, and the drop rate is adjusted to 50%. At this time, S2=2400 A, T14, T15=T13−T13×8% ms, and T4, T15=321 ms. The frequency f is 505 Hz.

In FIG. 10, the DC voltage, T4 to T8, S1, and T13 are in the same condition as in FIG. 8, and the drop rate is adjusted to 75%. At this time, S2=1200 A, T14, T15=T13−T13×8% ms, and T4, T15=379 ms. The frequency f is 451 Hz.

In each one of the above welding current waveforms, three nuggets are formed corresponding to the three peaks, in the first half, middle and second half. That is, referring to FIG. 8, one nugget is formed in the first half from the zero cross point A0 to the middle of the subsequent first rising straight line A, first pause straight line B, first drop straight line C, and first drop setting straight line D. One nugget is formed in the middle of this drop setting straight line D to the middle of the second rising straight line A1, second pause straight line B1, second drop straight line C1 and second drop setting straight line D1. One more nugget is formed in the second half from the middle of this second drop setting straight line D1 to the zero cross point A0 on the third rising straight line A2, third pause straight line B2, and nest rising straight line A. That is, a total of three nuggets are formed in a half cycle of zero cross point A0 to A0.

Thus, by setting the duration of T4, T5, T6 of the pause straight lines B, B1, B2 of the welding current waveform preliminarily at the same value, setting the duration of T7, T8 of the drop pause straight lines D, D1 preliminarily at a specific multiple of the set time T4 to T6, setting T4 to T6 of the pause straight lines B to B2 and drop pause straight lines D, D1 by tuning, and setting the rising current set value S1, and setting the drop rate from this rising current set value S1 to the current drop set value S2, the welding current waveforms shown in FIG. 8 to FIG. 10 are obtained. Hence, when changing the welding current waveform depending on the kind or material of the cylindrical bodies, the number of times of setting is curtailed as compared with the prior art, and the working efficiency is enhanced.

By welding between the overlaid portions of the cylindrical body in the above conditions, nuggets in a length of 0.4 to 0.9 mm are formed in a uniform size, without generating splashes, favorably at a small pitch interval of about 0.4 to 0.9 mm. After welding, the cylindrical body is free from blow holes or cracks, and is excellent in strength. Further, by forming such welding current waveforms by on/off switching control, the control speed of the straight lines A to B2 is increased. In particular, the rising straight lines A, A1, A2 of current waveform can be raised to the specified current set value S1 by a steep gradient. Hence, the welding speed between overlaid portions of a cylindrical body is enhanced. For example, in the case of cylindrical bodies(70 to 140 mm long) used in ordinary beverage cans, the welding speed is increased to about 1000 to 1200 pieces/minute. As a result, mass production of cylindrical bodies at high speed is realized, and the cost can be further reduced.

Besides, by forming uniform nuggets at a small pitch interval between the overlaid portions of a cylindrical body, the number of nuggets between the overlaid portions is increased. Hence, thin wall materials can be used for cylindrical bodies, and the manufacturing cost can be lowered. Moreover, in the case of three-peak current waveform, setting the welding speed of cylindrical bodies at about 500 to 1000 pieces/minute, nuggets of about 0.1 to 0.4 mm in length are formed favorably at a pitch interval of about 0.09 to 0.39 mm. The welding condition at this time is T4, T5, T6: T7, T8=1:1 to 2, T4, T5, T6=20 to 100 ms, T7, T8=20 to 200 ms, DC voltage=350 to 480 V, S1=2000 to 6000 A, drop rte=60 to 90%, S2=200 to 2400 A, T13=T14=T15=83 to 1745 ms, and frequency f=300 to 800 Hz.

In the above welding condition, setting the welding speed of cylindrical bodies at about 600 pieces/minute, nuggets of about 0.35 mm in length are favorably formed at a pitch internal of about 0.31 mm. At this time, the pitch interval is smaller than the nugget length, and adjacent nuggets overlap each other. By such overlapping, if a thin plate is used as the cylinder material (for example 0.1 to 0.25 mm) in particular, a strong welding strength is obtained. Also by overlapping, the generation of sparks in welding is extremely decreased, and current fluctuations are smaller. As a result, welding defects, or the defectives rate of products will be decreased, and damage of the welding transformer and others will be prevented.

Thus, according to the invention, by forming nuggets of uniform size between overlaid portions of cylindrical bodies favorably at a small pitch interval, cylindrical bodies excellent in strength are obtained. By welding the cylindrical bodies at high speed, the cost is reduced. When changing the welding current waveforms depending on the kind or material of cylindrical bodies, the number of times of setting is curtailed, and the working efficiency is enhanced.

What is claimed is:

1. A method of welding cylindrical bodies characterized by:

forming, by on/off switching control, welding current waveforms with two peaks having, within a half cycle (½f) of welding current, a first rising straight line (A) rising up to a specified rising current set value ($S_1$), a first pause straight line (B) extending from its upper end (A), a first drop straight line (C) dropping from its rear end (B) to a specified current drop set value ($S_2$), a first drop pause straight line (D) extending from its lower end (C), a second rising straight line ($A_1$) rising from its rear end (D) to the current set value ($S_1$), and a second pause straight line ($B_1$) extending from its upper end ($A_1$), setting the duration ($t_1$), ($t_2$) of the first and second pause straight lines (B), ($B_1$) of the welding current waveforms at the same value, setting the duration ($t_3$) of the first drop pause straight line (D) at a multiple of 1 or more of the set duration ($t_1$), ($t_2$) of the pause straight lines (B), ($B_1$), and adjusting the drop rate from the rising current set value ($S_1$) to the current drop set value ($S_2$) so that the duration ($T_{1-1}$) from the start of the first rising straight line (A) till the end of the first pause straight line (B) and the duration ($T_{1-2}$) from the start of the first drop straight line (C) till the end of the second pause straight line ($B_1$) may be in the relation of $T_{1-2}=T_{1-1}\pm T_{1-1}\times(0$ to $15\%)$.

2. A method of welding cylindrical bodies of claim 1, further characterized by:

forming, by on/off switching control, welding current waveforms with three peaks having, within a half cycle (½f welding current, a first rising straight line (A) rising up to a specified rising current set value ($S_1$), a first pause straight line (B) extending from its upper end (A), a first drop straight line (C) dropping from its rear end (B) to a specified current drop set value ($S_2$), a first drop pause straight line (D) extending from its lower end (C), a second rising straight line ($A_1$) rising from its rear end (D) to the current set value ($S_1$), a second pause straight line ($B_1$) extending from its upper end ($A_1$), a second drop straight line ($C_1$) dropping from its rear end ($B_1$) to the current drop set value ($S_2$), a second drop pause straight line ($D_1$) extending from its lower end ($C_1$), a third rising straight line ($A_2$) rising from the drop pause straight line ($D_1$) to the current set value ($S_1$), and a third pause straight line ($B_2$) extending from its upper end ($D_1$), setting the duration ($t_4$), ($t_5$), ($t_6$) of the first to third pause straight lines (B) to ($B_2$) of the welding current waveforms at the same value, setting the duration ($t_7$), ($t_8$) of the first and second drop pause straight lines (D), ($D_1$) at a multiple of 1 or more of the set duration ($t_4$), ($t_5$), ($t_6$) of the pause straight lines (B) to ($B_2$), and adjusting the drop rate from the rising current set value ($S_1$) to the current drop set value ($S_2$) so that the duration ($T_{1-3}$) from the start of the first rising straight line (A) till the end of the first pause straight line (B), the duration ($T_{1-4}$) from the start of the first drop straight line (C) till the end of the second pause straight line ($B_1$), and the duration ($T_{1-5}$) from the start of the second drop straight line ($C_1$) till the end of the third pause straight line ($B_2$) may be in the relation of $T_{1-4}$, $T_{1-5}=T_{1-3}\pm T_{1-3}\times(0$ to $15\%)$.

3. A method of welding cylindrical bodies of claim 1 or 2, wherein the drop rate from the rising current set value ($S_1$) to the current drop set value ($S_2$) is 30 to 90%.

4. A method of welding cylindrical bodies of claim 3, wherein the DC voltage for forming welding current waveforms is variable.

* * * * *

UNITED STATES PATENT AND TRADEMARK OFFICE
CERTIFICATE OF CORRECTION

PATENT NO. : 6,043,448
DATED : March 28, 2000
INVENTOR(S) : Kazuhiko Yokoya, Johichi Gotoh It is certified that error appears in the above-identified patent and that said Letters Patent is hereby corrected as shown below:

On the title page:

Foreign Priority: Japanese Patent Application Nos. 9-148661, filed May 21, 1997 and Japanese Patent Application No. 9-309288 filed October 22, 1997.

Signed and Sealed this

First Day of May, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO. : 6,043,448
DATED : March 28, 2000
INVENTOR(S) : Kazuhiko Yokoya, Johichi Gotoh It is certified that error appears in the above-identified patent and that said Letters Patent is hereby corrected as shown below:

Foreign Priority,
Japanese Patent Application Nos. 9-148661, filed May 21, 1997 and Japanese Patent Application No. 9-309288 filed October 22, 1997.

Signed and Sealed this

Twenty-first Day of August, 2001

Attest:

*Nicholas P. Godici*

NICHOLAS P. GODICI
*Attesting Officer*     *Acting Director of the United States Patent and Trademark Office*